US005420771A

United States Patent [19]

Katoh et al.

[11] Patent Number: 5,420,771

[45] Date of Patent: May 30, 1995

[54] ILLUMINATION DEVICE

[75] Inventors: Hideaki Katoh; Nobuhisa Noguchi, both of Saitama; Teruo Hoshi, Chiba, all of Japan

[73] Assignee: Dai-Ichi Seiko Co., Ltd., Kawaguchi, Japan

[21] Appl. No.: 10,778

[22] Filed: Jan. 29, 1993

Related U.S. Application Data

[60] Division of Ser. No. 709,797, Jun. 3, 1991, Pat. No. 5,186,537, which is a continuation of Ser. No. 240,733, Sep. 6, 1988, abandoned.

[30] Foreign Application Priority Data

| | | | |
|---|---|---|---|
| Dec. 7, 1987 | [JP] | Japan | 62-307447 |
| Dec. 25, 1987 | [JP] | Japan | 62-326861 |
| Dec. 28, 1987 | [JP] | Japan | 62-197345 |

[51] Int. Cl.⁶ .......................... B29C 45/03; B44F 1/02

[52] U.S. Cl. .................................... 362/347; 362/341; 264/135

[58] Field of Search ............... 362/296, 341, 347, 350; 264/1.9, 135, 259, 328.1; 156/242, 245, 199

[56] References Cited

U.S. PATENT DOCUMENTS

| | | | |
|---|---|---|---|
| 2,097,020 | 11/1937 | Ducer . | |
| 2,505,112 | 4/1950 | Hallman . | |
| 2,600,884 | 6/1952 | Kingston et al. | 362/347 |
| 2,699,402 | 1/1955 | Meyer | 264/1.9 |
| 3,009,055 | 11/1961 | Franzese . | |
| 3,127,113 | 3/1964 | Tomkinson . | |
| 3,594,244 | 7/1971 | Mackinnon et al. | 264/259 |
| 3,654,062 | 4/1972 | Loew | 264/259 |
| 3,763,348 | 10/1973 | Costello . | |
| 3,839,129 | 10/1974 | Neumann | 264/135 |
| 4,242,725 | 12/1980 | Douma et al. . | |
| 4,342,072 | 7/1982 | Guritz et al. . | |
| 4,558,400 | 12/1985 | Buser . | |
| 4,570,203 | 2/1986 | Daniels et al. | 362/347 |
| 4,642,741 | 2/1987 | Cohn | 362/341 |
| 4,660,131 | 4/1987 | Herst et al. . | |
| 4,794,503 | 12/1988 | Wooten et al. . | |
| 4,809,147 | 2/1989 | Negichi . | |
| 4,933,823 | 6/1990 | Taylor . | |

FOREIGN PATENT DOCUMENTS

| | | | |
|---|---|---|---|
| 0140690 | 5/1985 | European Pat. Off. . | |
| 2821375 | 11/1978 | Germany | 264/1.9 |
| 60844 | 8/1977 | Japan | 264/135 |
| 144938 | 11/1981 | Japan | 264/1.9 |
| 52626 | 3/1984 | Japan | 264/135 |
| 1035216 | 2/1986 | Japan | 264/135 |
| 1158550 | 7/1986 | Japan | 264/259 |
| 1269537 | 10/1989 | Japan | 264/259 |
| 2841826 | 6/1979 | Netherlands | 264/135 |
| 339786 | 12/1930 | United Kingdom | 362/341 |
| 2025838 | 1/1980 | United Kingdom | 264/1.9 |
| 1597492 | 10/1990 | U.S.S.R. | 362/341 |

*Primary Examiner*—Ira S. Lazarus
*Assistant Examiner*—Y. Quach
*Attorney, Agent, or Firm*—Cushman, Darby & Cushman

[57] ABSTRACT

A thin illumination device providing uniform luminance distribution on the diffusing plate comprising a reflecting plate, linear light sources arranged in the vicinity of the reflecting plate and a diffusing plate arranged on the opposite side of the reflecting plate with regard to the light sources, section of the reflecting plate having a shape of continuous curves having different curvature.

2 Claims, 5 Drawing Sheets

ILLUMINATION DEVICE

This is a division of application Ser. No. 07/709,797, filed Jun. 3, 1991, now U.S. Pat. No. 5,186,537, which was a continuation of Ser. No. 07/240,733, filed Sep. 6, 1988, now abandoned.

BACKGROUND OF THE INVENTION a) Field of the Invention

The present invention relates to an illumination device to be used as a surface light source having uniform brightness, for example, as a back light for a liquid crystal cell.

b) Description of the Prior Art

As the conventional illumination device for illuminating a plane surface at a uniform brightness over a relatively wide range, the illumination device having the composition shown in FIG. 1 is already known. This illumination device comprises two sets of parallelly arranged illumination systems; each consisting of a fluorescent tube 1 designed as a linear light source and a reflecting mirror 2 which is arranged under the fluorescent tube 1, and has an arcuate sectional shape or a quadratic curve sectional shape and is elongated in the longitudinal direction of the fluorescent tube 1; and a rectangular diffusing plate 3 arranged on the illumination systems.

Since the conventional illumination device of this type uses an arcuate reflecting mirrors having the sectional shape or a quadratic curve sectional shape, the illumination device has large thickness d and is designed as a relatively large unit accordingly. Therefore, the conventional illumination device is not suited for use as an illumination device for back lighting of a liquid crystal cell. Further, the conventional illumination device cannot assure uniform luminance on the diffusing plate 3 and has a defect that luminance is too low or the diffusing plate is too dark. In order to obtain a relatively uniform luminance distribution with this illumination device, it is sufficient to reserve a wide distance between the illumination systems 10 and the diffusing plate 3, but such a corrective measure is undesirable since it inevitably enlarges the illumination device and lowers luminance.

Further, as an illumination device of this type and having small thickness, the illumination device having the composition shown in FIG. 2 is also known. Speaking concretely, this illumination device comprises fluorescent tubes 1 parallelly arranged in a reflecting member 4 which is composed by arranging inclined and elongated plane reflecting mirrors 4b on both sides of a plane reflecting mirror 4a, and a diffusing plate 3 arranged over the fluorescent tubes 1. Though this illumination device can be thin and assure relatively high brightness, luminance distribution on the diffusing plate 3 is not uniform as shown in FIG. 3. In addition, since the boundary portion 4c between the bottom surface 4a and inclined surface 4b is folded, there are formed portions at which luminance is varied relatively abruptly on the diffusing plate 3.

SUMMARY OF THE INVENTION

A primary object of the present invention is to provide an illumination device comprising a reflecting plate, linear light sources arranged close to said reflecting plate and a diffusing plate arranged on the opposite side of said reflecting plate with regard to said light sources, sectional surface of said reflecting plate on the plane perpendicular to the longitudinal direction of said light sources having a shape of a concave curve whose curvature is continuously varying so as to assure uniform luminance distribution on said diffusing plate.

Another object of the present invention is to provide an illumination device characterized in that said reflecting plate is composed by bonding a metal foil forming a reflecting surface to said reflecting plate body made of a synthetic resin in said illumination device.

A third object of the present invention is to provide an illumination device wherein said reflecting plate is formed as am ember integral with a metal foil by injection molding of a reflecting plate body made of a synthetic resin.

A foruth object of the present invention is to provide an illumination device formed by combining a plural number of members which are obtained by dividing, along surfaces perpendicular to the longitudinal direction of said light sources, a reflecting plate made as a member integral with a metal foil by injection molding of a reflecting plate body made of a synthetic resin.

DETAILED DESCRIPTION OF THE PREFERRED EMBODIMENT

Now, an embodiment of the illumination device according to the present invention will be described in detail with reference to the accompanying drawings.

Figure 1:
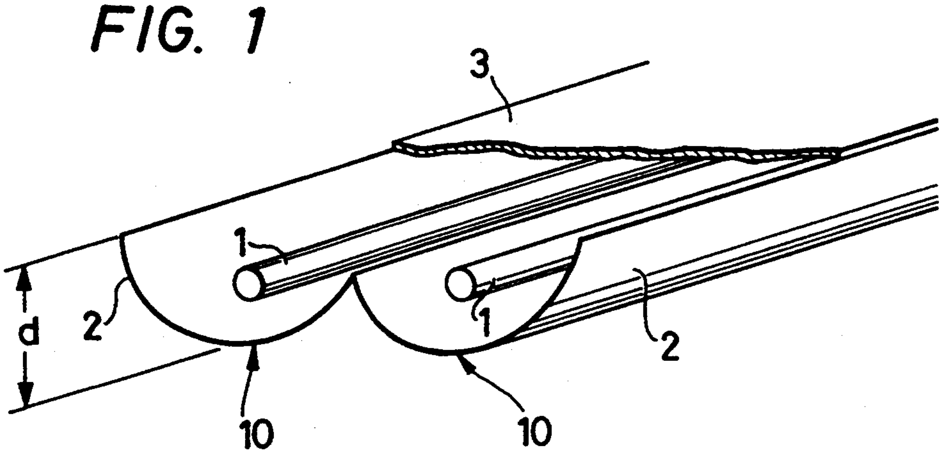
FIG. 1 and FIG. 2 show partially broken perspective views illustrating the conventional illumination devices respectively.
Figure 2:
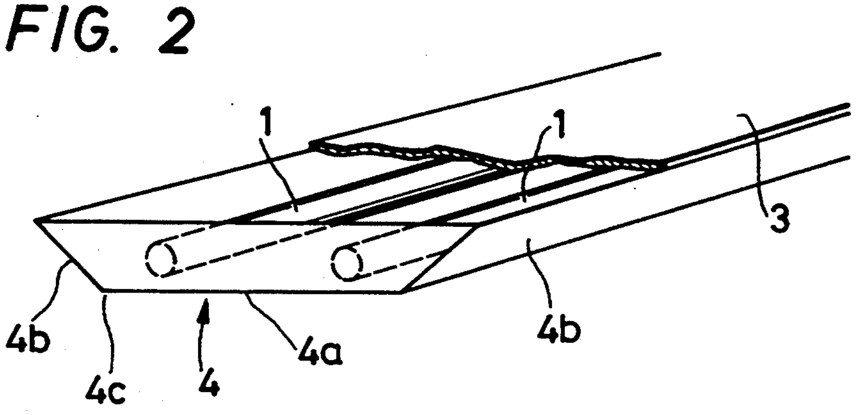
Figure 3:
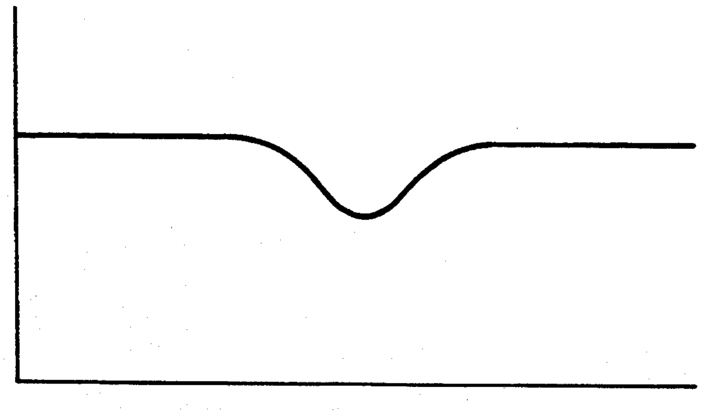
FIG. 3 shows a curve illustrating luminance distribution on the diffusing plate of the illumination device shown in FIG. 2.
Figure 4:
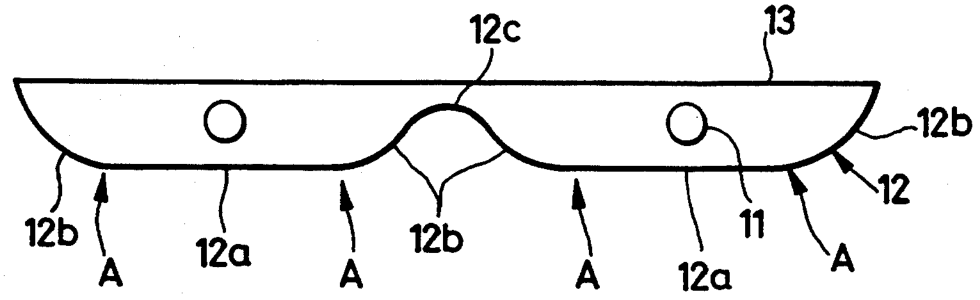
FIG. 4 shows a sectional view illustrating an embodiment of the illumination device according to the present invention.

A sectional view illustrating the embodiment of the present invention is shown in FIG. 4 wherein the reference numeral 11 represents linear light sources such as fluorescent tubes, the reference numeral 12 designates a reflecting plate and the reference numeral 13 denotes a diffusing plate.

In this embodiment of the illumination device, the reflecting plate 12 has flat surfaces 12*a* (having linear sections) under the light sources and surroundings thereof, and concave surfaces 12*b* (having curved sections) outside the points A relatively far from the light sources 11. Moreover, the curve on the section of the concave surface 12*b* has such a shape as to have different centers of curvature and radii of curvature at different points on the curve, and the flat surfaces 12*a* and curved surfaces 12*b* are continuous at all points thereof.

The continuous shape of said reflecting plate is different depending on the size, thickness, etc. of the illumination device as a whole. In addition, luminance distribution on the diffusing plate 13 can further be uniformalized by designing the flat surfaces of the reflecting plate 12 as concave surfaces having small curvature or other types of curved surfaces.

Figure 5:
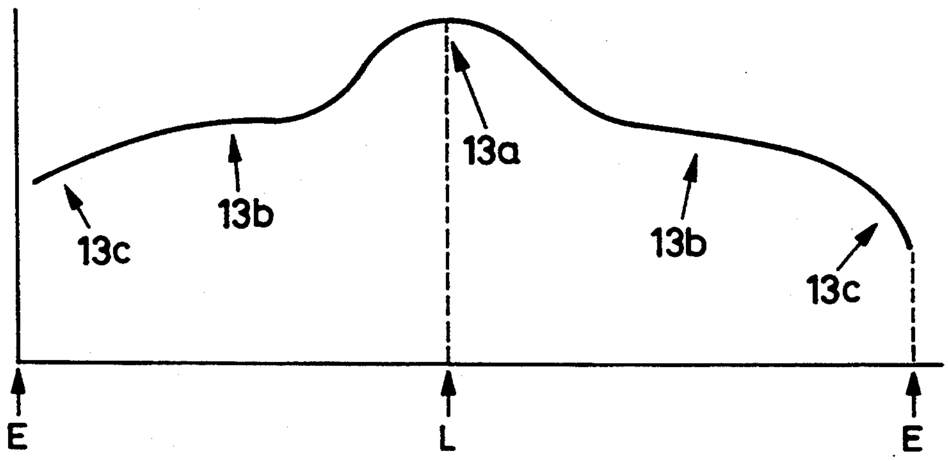
FIG. 5 shows a graph illustrating relationship between position of the light source and luminance distribution of the conventional illumination device.

When the reflecting plate has flat surfaces only, luminance distribution on the diffusing plate is as shown in FIG. 5. Speaking concretely, luminance is the highest at central portion 13*a* located right over the light source, lowers from intermediate portions 13*b* toward end portions 13*c* and is the lowest at the end portions 13*c*. In FIG. 5, the reference symbol L corresponds to the position of the light source and the reference symbol E corresponds to the end position of the reflecting mirror.

In the embodiment of the illumination device according to the present invention shown in FIG. 4, centers of curvature and radii of curvature at different points of the curve surfaces 12*b* of the reflecting plate 12 are so selected as to obtain a flat luminance distribution as whole by compensating luminance at the portions 13*b* and 13*c*.

Figure 6:
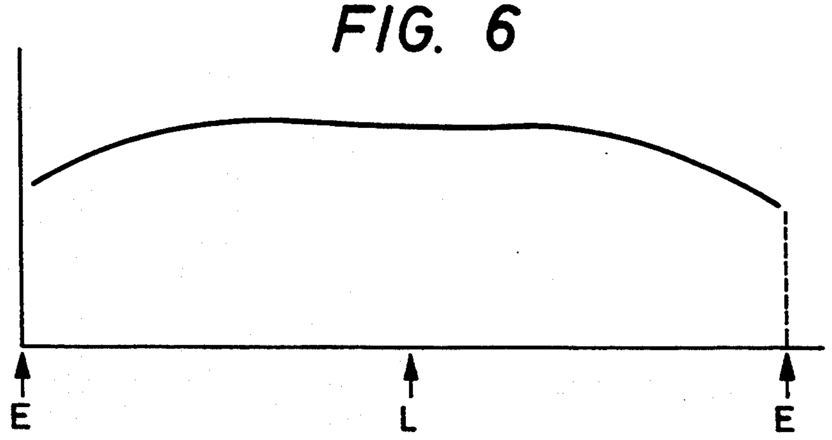
FIG. 6 shows a graph illustrating luminance distribution obtained by the embodiment shown in FIG. 4.

In this embodiment of the illumination device according to the present invention, luminance distribution on the diffusing plate 13 is as shown in FIG. 6, i.e., a very flat luminance distribution is obtained by designing the reflecting plate 12 so as to have the above-described shape. Further, since the reflecting plate 12 has a shape continuous over the entire range, the diffusing plate 13 has no portion which causes abrupt variation of luminance distribution.

The reflecting plate 12 of this embodiment has curved portions of special shapes and cannot be manufactured easily. However, manufacturing of the reflecting plate 12 can be facilitated by forming the reflecting plate body of a synthetic resin and arranging a metallic layer having high reflectance such as aluminium on the inside surface of the reflecting plate body. Moreover, mass production of the reflecting plate with very high precision is made possible by preparing metal dies having high precision for molding the reflecting plate body made of a synthetic resin.

In order to arrange the metallic reflecting layer in the reflecting plate body made of a synthetic resin, it is possible to adopt a method to plate or evaporation-coat the reflecting plate body with a metal, or a method to bond a metal foil to the reflecting plate body. The former plating or evaporation-coating method has defects that metals can hardly adhere directly to the surface of a synthetic resin and that the reflecting layer formed by this method can easily be cracked or peeled off due to variations of temperature and humidity. The latter method uses a bonding tape having adhesive surfaces on both sides to bond a metal foil to the surface of the reflecting plate body, requires tedious bonding work and easily allows the metal foil to be furrowed. Since a furrowed mirror surface will produce non-uniform luminance distribution on the diffusing plate of the illumination device, the latter method is undesirable.

One of the characteristics of the present invention lies in the molding method to form the reflecting plate made of a synthetic resin integral with the metal foil.

An embodiment of the molding method for forming the reflecting plate to be used in the illumination device according to the present invention will be described below.

Figure 7:
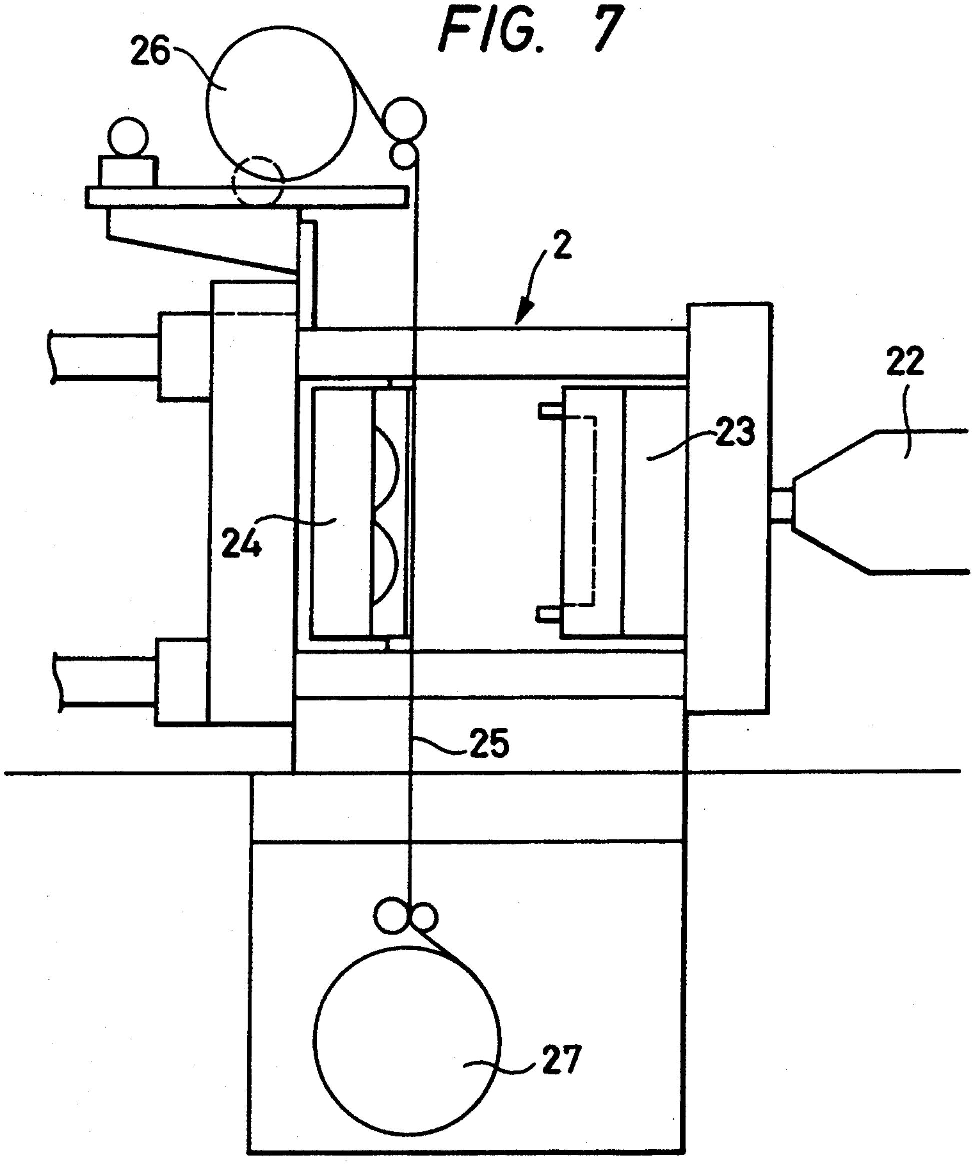
FIG. 7 shows a sectional view of an apparatus for molding the reflecting plate used in the illumination device according to the present invention.
Figure 8:
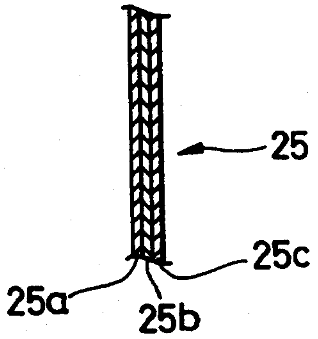
FIG. 8 shows a sectional view on an enlarged scale illustrating the metal foil sheet for forming the mirror surface of the reflecting plate.

An apparatus for carrying out the molding method for the reflecting plate is illustrated in FIG. 7 wherein the reference numeral 21 represents a molding press, the reference numeral 22 designates a nozzle of the molding press, the reference numerals 23 and 24 denote molding dies, the reference numeral 25 represents a ribbon consisting of a transparent film (base) 25*a*, a foil of a metal 25*b* such as aluminium and a layer of a bonding agent 25*c* formed thereon as shown in FIG. 8 in its sectional view, the reference numeral 26 designates a ribbon feed spool and the reference numeral 27 denotes a take-up spool.

By using the molding apparatus having the composition described above, the ribbon 25 is stretched between the molding dies 23 and 24 in the open condition of the dies, and then the dies are closed. With the ribbon 25 sandwiched between the molding dies 23 and 24 by using a clamp, a resin is injected into the cavity of the molding dies through the nozzle 22. Under the pressure produced by the injection of the resin, the base 25*a* of the ribbon 25 is pressed onto the core (having convex surfaces when the reflecting surface of the reflecting plate is concave) of the upper die 24, the bonding agent layer 25*c* on the opposite side is brought into close contact with the resin injected into the cavity, the bonding agent is melted by the heat of the resin, the metal foil 25*b* is made integral with the resin, whereby a reflecting plate having a metal foil made integral on the surface (for example, a concave surface) of the reflecting plate body made of the synthetic resin is formed after the resin is cooled and set. Then, the reflecting plate is obtained by opening the molding dies and taking out the molding. Since the metal foil 25*b* has been peeled off at this stage, a definite length of the base is wound around the take-up spool 27 to position the next ribbon 25 between the molding dies 23 and 24. Successively, the reflecting plate can be formed once again by repeating the processes described above.

Figure 9:
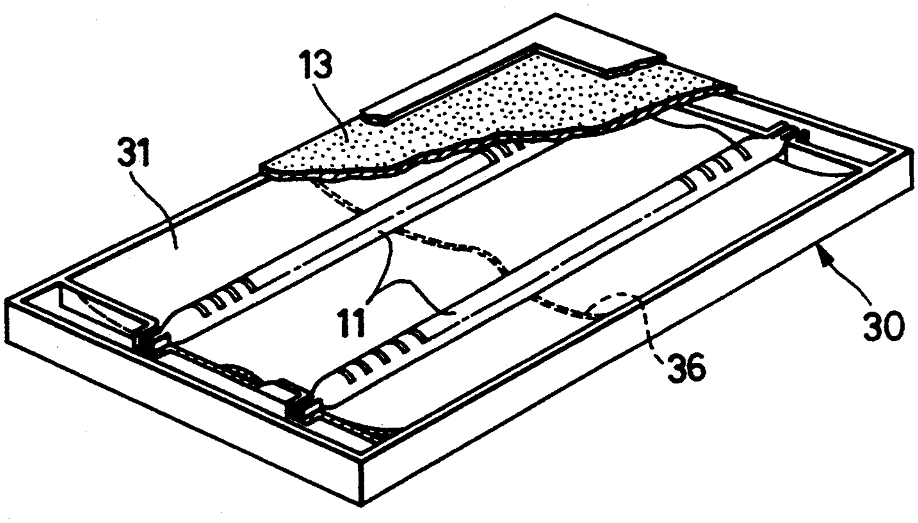
FIG. 9 shows a perspective view of the illumination device using the reflecting plate body formed integrally with a frame.
Figure 10:
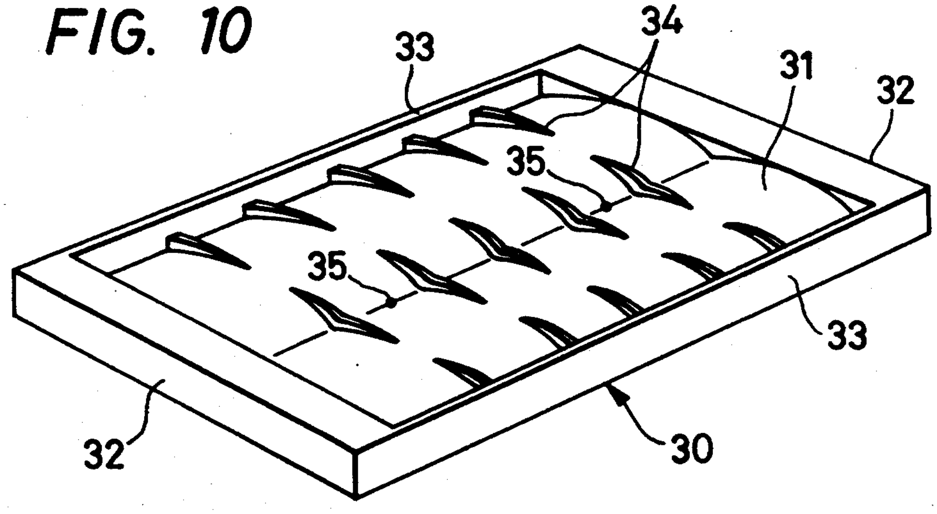
FIG. 10 shows a perspective view of the illumination device shown in FIG. 9 as seen from the bottom surface thereof.

When the reflecting plate having the shape shown in FIG. 4 is to be formed by this method, it is desirable to use molding dies which sets the gate at the position 35 on the rear surface of the reflecting plate 32 shown in FIG. 10. In other words, a weld line is produced at the confluence position of resin flow, thereby furrowing the metal foil in case of synthetic resin moldings. When the gate is located at the position shown in FIG. 10, however, the weld line 36 is produced in the direction perpendicular to the longitudinal direction of the light sources as shown in FIG. 9. Therefore, individual points on this weld line are located at different distances from the light sources even when the metal foil is furrowed by the weld line. Accordingly, since the portions reflecting light non-uniformly due to the furrow are not located at a definite distance from the light sources, no non-uniform luminance distribution is produced on the diffusing plate.

The reflecting plate shown in FIG. 9 and FIG. 10 has a structure wherein the reflecting plate body 30 is made integral with a frame 32 and 33. Therefore, this structure makes it unnecessary to assemble the reflecting plate with the frame, thereby facilitating assembly of the illumination device. The reflecting plate 31 must be thin to enhance accuracy of the reflecting surface. It is therefore desirable to mold reinforcing ribs 34 as integral members as shown in FIG. 10. In this case, the reinforcing ribs should preferably be elonged in the direction perpendicular to the longitudinal direction of the light soruces. That is to say, even if the metal foil on the reflecting surface is furrowed at the portions on the opposite side of the ribs 34 due to sink marks, etc. at the molding stage, the furrows are formed in the longitudinal direction of the ribs and do not produce non-uniform luminance distribution for the same reason as that due to the furrows produced by the weld line described above.

Now, descriptions will be made on another method to form the reflecting plate consisting of a reflecting plate body made of a synthetic resin and having a metal foil bonded to the surface thereof.

First, a reflecting plate body is formed by injection molding so as to have high accuracy on the side of the reflecting surface. A metal foil coated with a bonding agent on one surface thereof is brought into contact with one surface of the reflecting plate body in such a direction that the bonding agent is set on the side of the reflecting plate body,-pressed and heated, whereby a reflecting plate integral with a metal foil is formed.

This method has a defect that the means to mold the reflecting plate body and the means to fix the metal foil as an integral member of the reflecting plate body require separate processes. However, the metal foil cannot be furrowed when the reflecting plate body is made of a synthetic resin with high precision. Therefore, the illumination device using this type of reflecting plate is more desirable to assure uniform luminance distribution on the diffusing plate.

Figure 11:
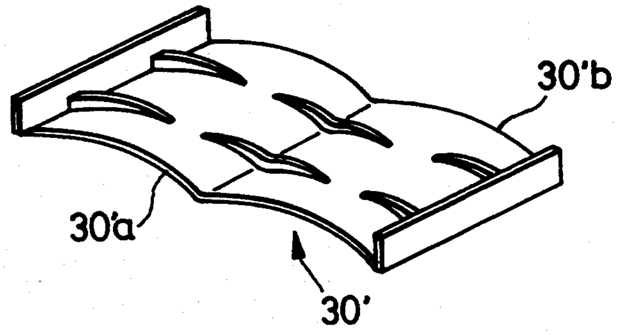
FIG. 11 shows a perspective view of a divided member of the reflecting plate body.

The reflecting plate having the above-described reflecting plate body made of a synthetic resin can hardly be molded with high precision, when it has a large size, due to the sink mark, etc. formed at the cooling stage. When a large reflecting plate is to be molded, it is therefore desirable to cut the reflecting plate body along the planes perpendicular to the longitudinal direction of the light soruces and combine a plural number of divided members. In other words, it is desirable to mold a plural number of the moldings 30' having the shape shown in FIG. 11, and bond the moldings on the sides of 30'a and 30'b so as to form a large reflecting plate body.

Figure 12:
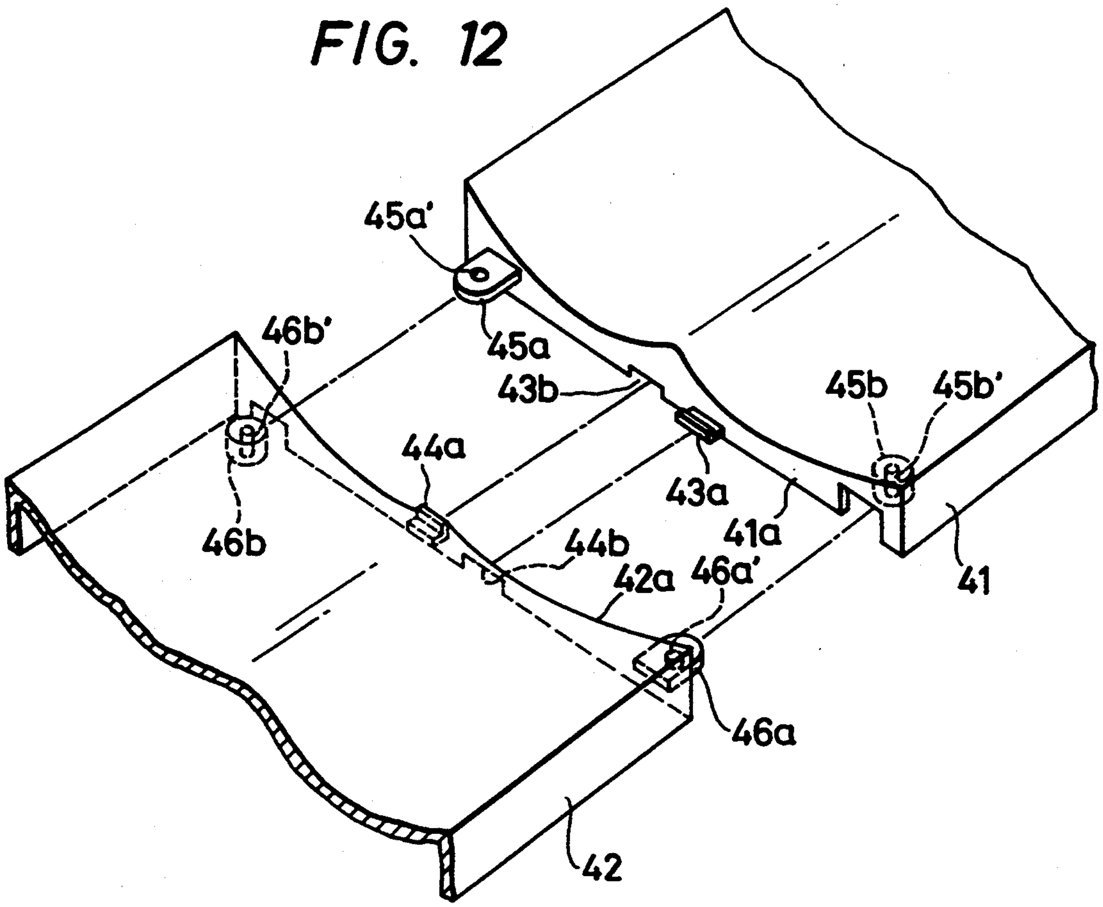
FIG. 12 shows an assembly diagram of the divided reflecting plate body.
Figure 13:
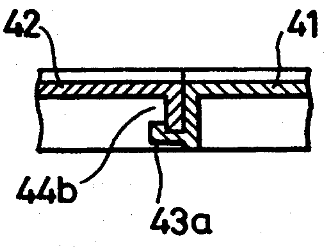
FIG. 13 and FIG. 14 show sectional views illustrating joined portions of the reflecting plate body in the assembled condition thereof.
Figure 14:
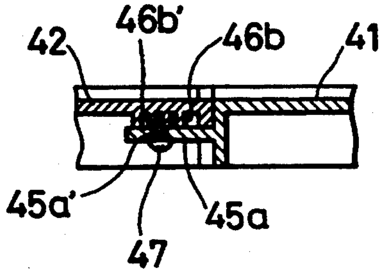

In order to bond a plural number of the members of the reflecting plate to form a large reflecting plate, the bonding means illustrated in FIG. 12 through FIG. 14 can be used in addition to the bonding method of the reflecting plate members.

In FIG. 12, the reference numerals 41 and 42 represent reflecting plate members as cut or divided parts of the reflecting plate shown in FIG. 9 and FIG. 10. Formed on the end surface 41a of the reflecting plate member 41 are an elastic piece 43a having upward hook at the tip thereof at a position a little rightward in the vicinity the center of the end surface and a notch 43b at a position a little leftward from the center of the end surface 41a. Further, formed on the end surface of the reflecting plate member 41 are a protrusion 45a having a hole 45a' at the left end thereof and a downward boss 45b having a tapped hole 45b' into which a screw can be forcibly screwed at the right end thereof. Similarly, the reflecting plate member 42 has an elastic piece 44a having an upward hook, notch 44b, a protrusion 46a having a hole 46a' and a boss 46b having a tapped hole 46b'.

When these reflecting plate member 41 and reflecting plate member 42 are set in the positions shown in FIG. 12, the hook-shaped elastic piece 43a faces the notch 44b, the notch 43b faces the hook-shaped elastic piece 44a, the protrusion 45a faces the boss 46b and the protrusion 46a faces the boss 45b.

In order to join the reflecting plate members 41 and 42 to each other, the members are set and brought into contact with each other in such positions that the end surfaces 41a and 42a cross each other in an "X" shape, and then turned in the directions opposite to each other until the end surfaces are matched. Accordingly, the hook-shaped elastic piece 43a is engaged with the engaging end of the notch 44b and the hook-shaped elastic piece 44a is engaged with the engaging end of the notch 43b respectively as shown in FIG. 13. Simultaneously, the protrusion 45a is fitted into the boss 46b and the protrusion 46a is fitted into the boss 45b respective as shown in FIG. 14. By this assembling procedure, the reflecting plate members 41 and 42 are joined to each other, and a large reflecting plate is formed.

The joint can be made more secure by bonding both the reflecting plate members with a bonding agent at the joining stage described above.

As another method to join both the reflecting plate members, it is possible to form protrusions of the shape similiar to that of the protrusions 45a and 46a shown in FIG. 12 but with no tapped holes and protrusions to be engaged therewith at opposite positions, assemble both the reflecting plate members, and then make the protrusions integral by melting.

In any case of the joining, screwing and solvent welding of both the reflecting plate members, the joint can be made more secure by bonding the end surfaces thereof with a bonding agent.

Further, since the reflecting plate members 41 and 42 have the same shape as shown in FIG. 12, two reflecting plate members of the same type can be joined in the opposite directions. Moreover, it is possible to prepare the reflecting plate body by forming the elastic pieces, protrusions and bosses on both the end surfaces of the reflecting plate members, for example, in the arrangement on the reflecting plate member 41 on one end surface and in the arrangement on the reflecting plate member 42 on the other end surface, and joining a plural number of the reflecting plate members on the same type.

Though the above-described illumination device according to the present invention has a concave surface on the reflecting plate, this surface may be designed as a Fresnel surface (a surface similar to the surface of a Fresnel lens). In this case, the reflecting plate has a smaller thickness, thereby making it possible to form a thinner illumination device.

Since the illumination device according to the present invention uses the reflecting plate having a central surface designed as a plane surface or nearly plane surface with large radii of curvature and a curved surface with radius of curvature gradually varying in the vicinity of its end as described above, the illumination device can be very thin and assure uniform luminance distribution on the diffusing plate thereof. Further, mass production of the illumination device is possible, though the reflecting plate has the special shape described above, by forming the reflecting plate body by injection molding of a synthetic resin. Furthermore, a mirror surface from which the metal foil is not peeled off can be formed easily by forming the reflecting plate body integral with the metal foil at the molding stage. Moreover, when a large reflecting mirror is to be formed by this method, it is possible to prepare a large reflecting plate, with little influence on luminance distribution of the diffusing plate, by molding reflecting mirror members in the shapes of the reflecting plate cut or divided along the planes perpendicular to the longitudinal direction of the light sources and joining these reflecting plate members.

We claim:

1. An illumination device, comprising:

a molded reflecting plate;

at least one linear light source in the vicinity of said reflecting plate;

a diffusing plate disposed on an opposite side of said linear light source with respect to said reflecting plate;

said reflecting plate being molded according to a process comprising injecting raw material into a cavity formed by metal dies one of which has a plurality of gates extending parallel to longitudinal direction of said linear light source, whereby no unevenness of brightness is caused due to the arrangement of the gates, and a reflecting surface is formed on said reflecting plate by arranging a metal foil having a layer of bonding agent formed directly on one surface thereof in said metal dies, and said raw material injecting into said cavity of said dies from a side where said layer of bonding agent is arranged on said metal foil.

2. An illumination device according to claim 1, wherein:

said molded reflecting plate which is disposed in the vicinity of said linear light source, comprises reinforcing ribs formed on one surface thereof and extended in a direction which is perpendicular to an extending direction of said linear light source.

* * * * *